Patented May 15, 1945

2,376,133

UNITED STATES PATENT OFFICE 2,376,133

PLASTIC CEMENT

Henry Ford and Robert A. Boyer, Dearborn, and Paul J. Beyer, Detroit, Mich., assignors to Ford Motor Company, Dearborn, Mich., a corporation of Delaware No Drawing. Application October 31, 1941, Serial No. 417,270

4 Claims. (Cl. 260—7)

This invention concerns cements having resinous bases and principally those cements which are particularly applicable to the joining and fabrication of plastic material of various sorts.

The cement of this invention is based upon a synthetic resin which may be of the urea-formaldehyde or phenol-formaldehyde type. This resin forms the bonding portion of the cement and is associated with a treated filler to which, in a large part, is attributed superior bonding effect of the cement and its freedom from shrinkage during the setting process.

The primary object of this invention is to provide a cement which may be used to join non-metallic objects such as panels or parts of plastic, plywood, wood, impregnated pulp, pulp boards and the like. For convenience, the word, "plastics" will be used hereinafter as referring broadly to these classes of objects.

At the present time, the demands of national defense have caused shortages in various industrial metals and manufacturers have turned their attention toward plastics of various sorts as substitutes therefor. Of course, this trend has been noticeable for some years past but it is being accentuated in the present crisis. Particularly is this true in the use of molded plastic to replace small objects usually made by die-casting metal. Considerable progress has also been made in effecting suitable substitution, even in such large objects as automobile bodies, refrigerators, airplane wings and fuselages. These objects, or parts thereof, have been fabricated from true plastics, or from laminated wood, cloth, paper or fibers that have been impregnated with resin and molded. There are, however, limitations to the size of the individual panels or parts that may be processed; and it follows that in many instances the finished object is composed of a number of smaller portions joined together.

In addition, the high degree of accuracy which may be obtained in metal stampings is difficult to achieve in the larger molded plastic panels. Thus, when assembling and joining the smaller panels, it is apparent that there will be many joints and miters which require cementing and, in many cases, the gaps at these joints may be of considerable size. Common experience has borne out the fact that a cement which may be highly suitable for two objects in immediate contact is unsatisfactory when a considerable gap exists between the two objects. Contact cements of this type generally set to form a very hard and brittle substance which is not wanting in body strength, but large allowance must be made for shrinkage and setting. This is true even though the surface bond for the cement may be eminently satisfactory insofar as adhering to the object is concerned. However, the cemented joint itself is wholly unsatisfactory.

Therefore, another object of this invention is to provide a filler cement which not only has satisfactory bonding characteristics with the objects to be joined but which also possesses bodily strength equal at least to that of the joined objects. It is also an object to obtain a cement which will set readily with or without the application of heat, and which will not shrink unduly on setting. A further object is to obtain a cement which, when set, may be finished with ordinary tools and which will take the usual surface finishes. Yet another object is to obtain a cement which, while having adequate binding characteristics with the range of materials mentioned above, forms a particularly strong bond with panels formed of molded fibers and resins.

One form of this cement utilizes the reaction of urea and formaldehyde to form the resin base. To this is added a treated filler which gives the required bulk and body characteristics. As a specific example, 35 parts of 40 per cent commercial formaldehyde and one part of zinc, either in the form of dust or mossy zinc, are mixed and heated to the boiling point. Thereafter, this mixture is cooled to the range of approximately 180°–190° F. Urea is added to this cooled mixture in the ratio of 10 parts of urea to 35 parts of the mixture. Thereafter, it is again brought to a boiling point and held there for approximately five minutes. The mixture is again cooled and the zinc removed either by filtration or separation, depending upon the zinc form used. The mixture at this point is referred to as a partial condensate. It is then subjected to heat and vacuum for dehydration. This is continued until the temperature rises to 120°–130° F., when it will be found that approximately half the weight of the original mixture has been removed as water. The condensate is then cooled to the consistency of petroleum jelly and is water soluble.

It will be recognized by those skilled in the art that if this partial condensate is subjected to further heat, it will attain the insoluble and infusible stage of the resin. For the purpose of this invention, however, an accelerator is preferred as a means of obtaining the final state. Experiments indicate that one of the most suitable accelerators is monoammonium phosphate, while diammonium phosphate is much less satisfactory. If this accelerator is mixed with the partial condensate, when it is in the form described above, i. e., having the consistency of petroleum jelly and water soluble, it will be found that the resin will be changed to its final insoluble and infusible state in a period of from two to 20 hours, depending upon temperature conditions. This resin and the accelerator serve as the base of the cement.

As pointed out above, pure resin alone is highly unsatisfactory as a cement and a filler of one sort or another must be mixed with it if it is to be used in this field. Considerable experimentation has been done on materials which may be used as fillers. It has been found that soy-meal meal, cellulose fibers, wood flour and other similar materials which may be saturated with resin give best results. For the purpose of illustrating the present invention, a soy-bean meal from which the oil has been extracted has been chosen. This meal is thoroughly mixed with a water-soluble resin, as, for instance, three parts of 50 per cent nonvolatile-content, water-soluble phenolic resin to two parts of the soy-bean meal. The essence of this treatment is that the meal must be entirely impregnated by the resin and the most intimate mixture of the two constituents must be obtained. The mixture is then placed in a shallow pan and cured in an oven at from 250°–350° F. This procedure cures the resin which becomes insoluble and infusible. The resulting mixture of resin and soy-bean meal, which is now hard and brittle, is ground into a fine powder. It is essential that the filler be so treated before admixture with the partial condensate. A mere mixture of resin and untreated filler is entirely unsatisfactory.

This powder, which is the filler referred to, is mixed with the resin described above in the following proportions:

| | Parts |
|---|---|
| Urea-formaldehyde resin | 10 |
| Phenolic resin-treated soy-bean meal | 5 |
| Monoammonium phosphate (saturated, aqueous solution) | 1 |

The proportions of the specific example are illustrative only. To avoid shrinkage on setting, there should be enough of the treated filler present to form, as it were, a skeleton of supporting grains throughout the mass. These will not alter in size. The interstices between these grains are filled with the partial condensate. While this shrinks on setting, it is evident that the mass will not change in size due to the presence of the stable filler.

It will be recognized that this mixture should be made shortly before the cement is to be applied, since the resin in the presence of the accelerator will begin to set in approximately 30 minutes and the complete reaction will occur from within two to 24 hours, depending upon temperature.

While a specific example of resin and filler has been described in full, this invention may also use other resins of the general type indicated, as well as various fillers. But, to be satisfactory, whichever of the materials is used as a filler, it must be treated as has been indicated herein.

One field in which cement of this type has particular value is in the manufacture and repair of plastic body panels for automobiles and similar structures. Not only is it indispensable in the initial fabrication of the body for joining together the individual panels, both as a cement and a filler, but it will have a wide field of application in the subsequent repair of these panels. In spite of the impact resistance of these panels, it may reasonably be expected that accidents will occur in which they will be cracked or punctured. Smaller cracks or punctures can be filled with this type of cement which bonds readily with the material of the panel. After the cement hardens, the excess can be removed and finished to conform with the surrounding contours. For larger punctures, a patch of panel material may be inserted and bonded with cement to the edges of the hole and additional cement plastered over the patch surface to make a continuous surface with the original panel. The strength of the bond between the cement and the panel and the strength of the cement mass itself being comparable to or exceeding the original panel strength, the structural strength will be maintained. In this respect, the method of repair may be compared to metal welding, in which a defective or destroyed portion may be cut out and replaced by another without any consequent loss of strength or appearance.

As has been stated, the setting time for the cement is from two to 20 hours, depending upon the temperature. This may be accelerated by such means as are used in the automobile industry for drying paint or lacquer, as by the use of carbon filament lamps, ovens and the like. This cement, however, differs from those previously known having anywhere near comparable strength in that elevated temperatures are not required for setting. This is most advantageous in assembly work where the individual panels may be cemented and clamped together and the assembly need not be subjected to unduly high temperatures which might destroy or affect the work previously done on it.

A further advantage of the cement is its resistance to shrinkage on setting. Most cements of comparable usage shrink as much as 40 to 50 per cent. The stability of the present cement is believed to be due chiefly to the added resin-treated filler. There is no dimensional change in the filler itself during the mixing or setting as the cured resin therein protects the filler from the moisture in the binder resin base. It therefore follows that the filler maintains the same size throughout and as enough of it is present to form practically a continuous bridging mass throughout the cement, there can be no appreciable shrinkage on setting. An analogy may be drawn to the use of aggregates with cement to form concrete. But, in addition, there is some actual bonding between filler and binder not found in concrete and which adds greatly to the cohesiveness of the mass.

The conventional compression and shearing tests are used as a basis in determining the strength of cement and indicate the superiority of the present substance. It has also been found that the present cement is impervious to moisture. The value of this is well appreciated by those who realize the generally hygroscopic tendencies of most plastic mixes. Indeed, when the setting has been completed, the cement will not be affected, even by submergence in boiling water for considerable periods of time.

Some changes may be made in the various ingredients in their proportion used in the improved cement without departing from the spirit of the invention, and it is the intention to cover by the claims such changes as may reasonably be included within the scope thereof.

We claim as our invention:

1. A cementitious material, comprising, a water soluble, partial condensation product of urea-formaldehyde, soy-bean meal impregnated with a cured phenol formaldehyde resin, and monoammonium phosphate.

2. A cementitious material, comprising, substantially ten parts of water soluble urea-formaldehyde condensation product, five parts of cured phenol formaldehyde resin saturated soy-bean meal filler, and one part of a saturated, aqueous solution of monoammonium phosphate.

3. The method of making a cement which comprises the steps of impregnating soy-bean meal with a water soluble phenol formaldehyde resin forming a filler material, heating said impregnated mass of filler material to cure the resin therein and convert said resin to an insoluble state, reducing said mass of cured material to a finely divided filler material, and mixing said filler with a partial condensation product of a water soluble, urea-formaldehyde resin in such proportions that substantially continuous contact between said filler particles is obtained throughout the mixture and the interstices therebetween are filled with said partial condensate, and accelerating the condensation reaction by addition of monoammonium phosphate causing said cement to set at room temperatures.

4. A method of making a water-insoluble cement comprising, impregnating moisture-absorbent soy-bean meal with the phenol-formaldehyde resin, curing the impregnated material to cure said resin to an infusible state, grinding said cured resin forming a stabilized filler material, mixing said stable filler material with a partial condensation product of water soluble urea formaldehyde, said condensate possessing slow aging characteristics at room temperature, and adding saturated aqueous solution of monoammonium phosphate in quantities sufficient to accelerate the reaction at room temperature.

HENRY FORD.
ROBERT A. BOYER.
PAUL J. BEYER.